US006241151B1

(12) United States Patent
Swaine et al.

(10) Patent No.: US 6,241,151 B1
(45) Date of Patent: Jun. 5, 2001

(54) SELF SERVICE TERMINAL

(75) Inventors: Stephen Swaine, Perthshire; Grant C. Paton; Kenneth A. Nicoll, both of Dundee, all of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/433,136

(22) Filed: Nov. 3, 1999

(30) Foreign Application Priority Data

Nov. 11, 1998 (GB) .................................................. 9824766

(51) Int. Cl.[7] ...................................................... G06F 17/60
(52) U.S. Cl. ............................................... 235/379; 902/35
(58) Field of Search ................................ 902/35; 235/379

(56) References Cited

U.S. PATENT DOCUMENTS

| | | | | |
|---|---|---|---|---|
| D. 272,293 | * | 1/1984 | Barthel | 902/30 |
| 4,121,523 | * | 10/1978 | Hastings | 902/35 |
| 4,359,631 | * | 11/1982 | Lockwood et al. | 902/30 |
| 4,568,803 | | 2/1986 | Frola . | |
| 4,695,903 | | 9/1987 | Serap et al. . | |
| 5,600,114 | * | 2/1997 | Dunlap et al. | 902/35 |
| 5,616,900 | | 4/1997 | Seewoster . | |
| 5,748,721 | | 5/1998 | DiCosmo et al. . | |

FOREIGN PATENT DOCUMENTS

| | | |
|---|---|---|
| 2454454 | 5/1976 | (DE) . |
| 29604695 | 7/1996 | (DE) . |
| 0492051 | 7/1992 | (EP) . |
| 0780815 | 6/1997 | (EP) . |
| 2119992 | 11/1983 | (GB) . |
| 2317138 | 8/1998 | (GB) . |
| 9720119 | 6/1997 | (WO) . |

* cited by examiner

*Primary Examiner*—Harold I. Pitts
(74) *Attorney, Agent, or Firm*—Michael Chan

(57) ABSTRACT

A self service terminal (10) is described. The SST 10 has a front portion (16) including a user interface (24) located within a fascia (18). The fascia (18) has a concave inner surface (61) which defines a privacy area (20) and which reduces reflection of sound. The inner surface (61) is bounded by one or more extremities (54,56) which project out from the terminal (10). The fascia (18) has a canopy (21) which extends beyond the projecting extremities. In use, the user places his head within or in proximity to the privacy area (20) for increased privacy when using the terminal (10).

20 Claims, 3 Drawing Sheets

SELF SERVICE TERMINAL

BACKGROUND OF THE INVENTION

The invention relates to a self-service terminal (SST). In particular, the invention relates to a transaction based SST such as an automated teller machine (ATM) which uses voice or speech recognition.

ATMs are commonly located in public areas to provide ease of access for members of the public. A problem associated with using ATMs is that the user of an ATM may believe that the transaction being conducted is not private, particularly if the ATM uses voice or speech recognition. One reason for this is due to the public location of the ATM and the possibility of passers-by hearing, for example, the user speaking to the ATM.

SUMMARY OF THE INVENTION

It is an object of the invention to provide a SST which obviates or mitigates the above disadvantage.

According to the invention, a self service terminal includes a user interface located within a fascia, characterized in that the fascia has a concave inner surface defining a privacy area.

The word concave is not intended to be limited to a continuously curved surface having a uniform radius, but is intended to include, for example, surfaces having a plurality of flat surfaces, where the flat surfaces provide a recess which is generally D-shaped in the horizontal plane.

Preferably, the fascia has a sound absorbing surface for minimizing reflection of sound from the fascia. The sound absorbing surface may be a coating applied to the surface, the surface may be treated to provide sound absorbing properties, or the entire fascia may be constructed from sound absorbing material.

By virtue of the invention a user of a SST can place his or her head in proximity to the privacy area, and speak and/or listen to the SST with increased privacy and isolation from passers-by.

The inner surface is bounded by one or more extremities which project out from the terminal, so that the user's head may be inserted beyond the one or more extremities of the fascia into the privacy area.

Preferably, the fascia defines an upright longitudinal axis. Conveniently, the upright axis is substantially vertical.

Preferably, the concave inner surface has a generally arcuate cross-section in a plane transverse to the upright axis.

Preferably, the fascia tapers relative to the upright axis so that the fascia is radially more distant from the upright axis at the top of the privacy area than at the bottom of the privacy area. Conveniently, the fascia has a conical or frusto-conical shape cut away in the plane of the upright axis.

Preferably, the privacy area is approximately 1 m high. Preferably, the privacy area is located within the range from approximately 0.5 m to approximately 3 m above ground level; more preferably, within the range 0.8 m to 2.5 m; conveniently, the bottom of the privacy area is located 1.1 m above ground level.

Preferably, the fascia defines a dispensing area beneath the privacy area. One advantage of having a dispensing area located beneath the tapered fascia is that the taper of the fascia leads the eyes of a user to the dispensing area. Another advantage is that the tapered fascia reduces the volume of the privacy area, thereby increasing the sense of privacy for users of the terminal.

Preferably, the terminal has a covering extending beyond the fascia to protect a user from precipitation or falling objects. Conveniently, the covering is a sound absorbing canopy.

Preferably, the covering has visual indicators for indicating the current status of the SST, for example, whether the SST is in service or out of service. The visual indicators may be colored lights, where one color of light is used if the SST is in service and another color of light is used if the SST is out of service. Alternatively, the visual indicators may be lights which, when illuminated, spell words such as "working" or "out of service".

Preferably, the covering includes lighting for illuminating the inner surface of the fascia. Conveniently, this lighting may be dimmed if the SST is out of service.

Preferably, the SST is an ATM using voice or speech recognition.

BRIEF DESCRIPTION OF THE DRAWINGS

Embodiments of the invention will now be described, by way of example, with reference to the accompanying drawings in which.

DETAILED DESCRIPTION

Figure 1:
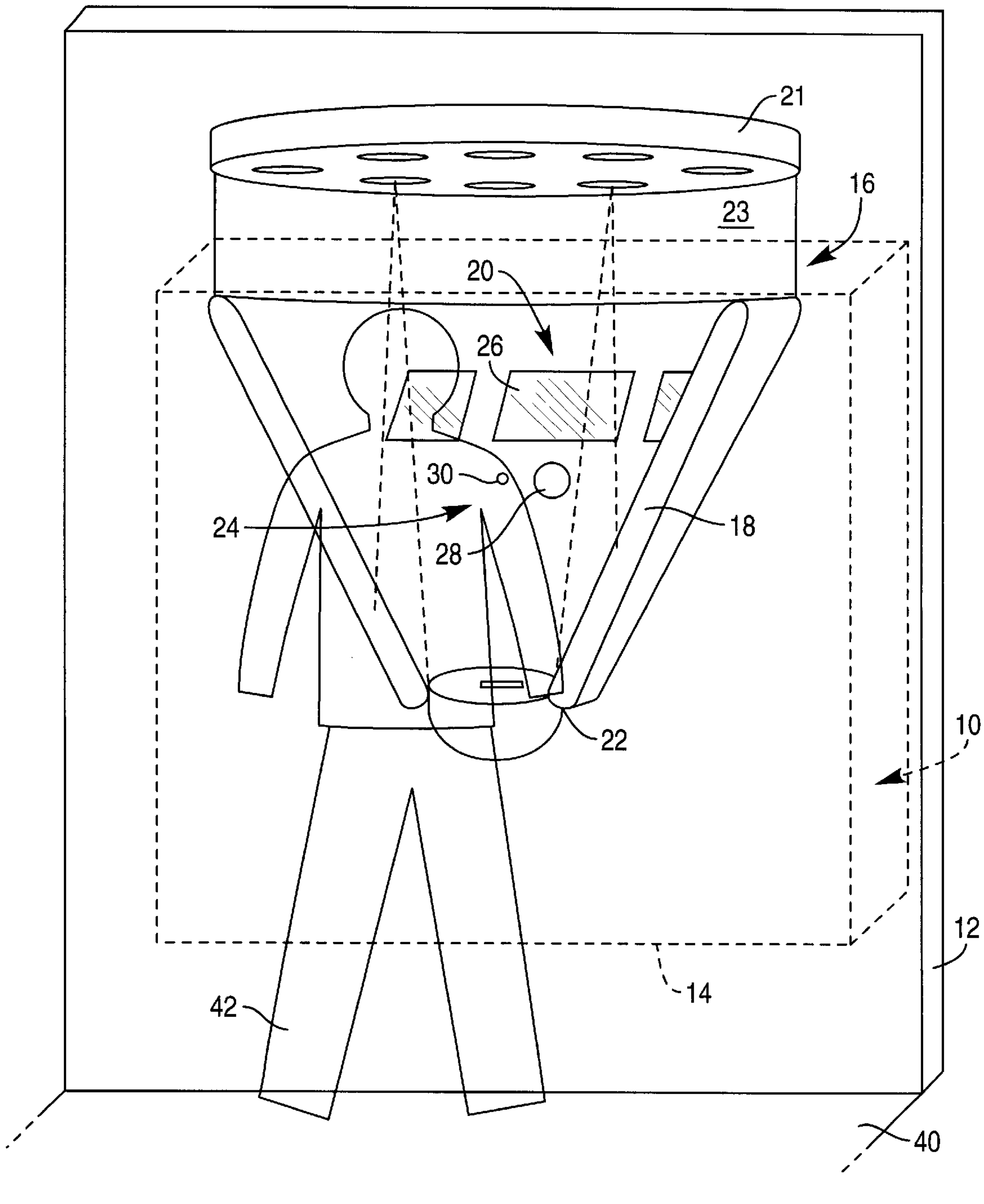
FIG. 1 is a front view of a self service terminal according to one embodiment of the invention.

Referring to FIG. 1, an SST 10 in the form of a through-the-wall ATM is shown partly protruding through a wall 12. The rear (behind the wall) portion 14 of the ATM 10 is shown in broken line. The front portion 16 includes a fascia 18 which is shaped to define a privacy area (shown generally by arrow 20), a covering 21 in the form of a canopy, a dispensing area 22, and an arcuate spacer 23 separating the fascia 18 from the canopy 21.

The fascia 18 incorporates a user interface 24 including a human iris recognition sensor 26, a microphone 28, and a loudspeaker 30. The fascia 18 is located at a height suitable for an average height person to use, in this embodiment the lower part of the fascia 18 is located approximately 1.1 meter above ground level 40. A user 42 is shown to illustrate the position of the fascia 18 relative to a user 42.

Figure 2:
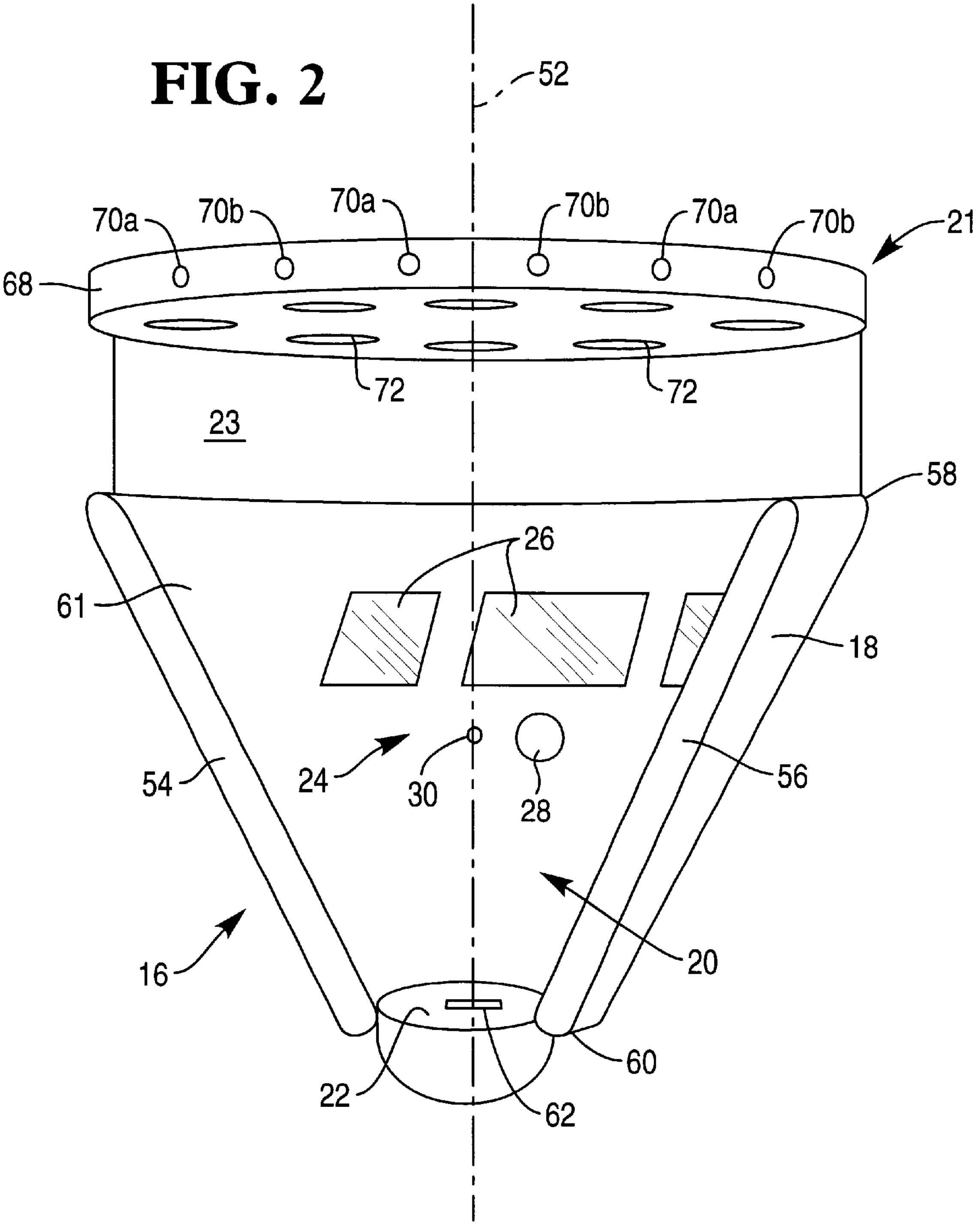
FIG. 2 shows the front portion of the SST of FIG. 1 in more detail.

Referring to FIG. 2, the fascia 18 is made of high density foamed polymer material for absorbing sound, and the fascia 18 defines an upright longitudinal axis 52 which is substantially vertical. The fascia 18 has a frusto-conical shape cut-away in the plane of axis 52 (parallel to the surface of wall 12 in FIG. 1) to reveal two extremities 54,56, being edges of the fascia 18. The fascia 18 is more radially distant from the axis 52 at the top surface 58 than at the bottom surface 60 Fascia 18 has an inner surface 61 which defines the privacy area 20. The surface 61 is bounded by edges 54,56, top surface 58 and bottom surface 60. The distance between the top surface 58 and the bottom surface 60 is approximately 66 cm. The distance between edges 54 and 56 at the top surface 58 is approximately 80 cm and at the bottom surface 60 is approximately 30 cm.

The dispensing area 22 includes a dispensing slot 62 through which valuable media such as bank notes are dispensed.

The fascia 18 has a canopy 21 made from high density foamed polymer material. Canopy 21 is disposed above the privacy area 20 and separated from the top surface 58 by spacer 23. The canopy 21 extends beyond the edges 54,56 and includes a front portion 68 having visual indicators 70 in the form of LEDs for indicating to passers-by the status of the ATM 10. Alternate red 70*a* and green 70*b* LEDs are used. When the ATM 10 is working then the green LEDs 70*b* are illuminated; whereas when the ATM 10 is not working then red LEDs 70*a* are illuminated. The canopy 21 also has lighting 72 which is directed downwards for illuminating the privacy area 20. This lighting is dimmed or extinguished if the ATM 10 is not working.

The rear portion 14 contains a cash dispensing mechanism (not shown) for delivering bank notes to the dispensing area 22. The rear portion 14 also contains a human iris recognition unit (not shown) for use with the human iris recognition sensor 26 (FIG. 1).

Suitable iris recognition units and sensors are available from "SENSAR" of 121 Whittendale Drive, Moorestown, N.J., USA 08057.

In use, a user 42 approaches the ATM 10 and is identified by the iris sensor and unit combination. Thereafter, the user 42 communicates with the ATM 10 by listening to speech from the loudspeaker 30 and speaking into the microphone 28. If the user 42 requests a cash withdrawal then the ATM 10 authorizes the transaction in a conventional manner.

When speaking to the ATM 10, the user 42 places his head in proximity to or within the privacy area 20. The concave shape of the fascia 18 provides a feeling of security and privacy, and the sound absorbent material from which the fascia 18 is constructed reduces reflection of the user's speech.

Figure 3:
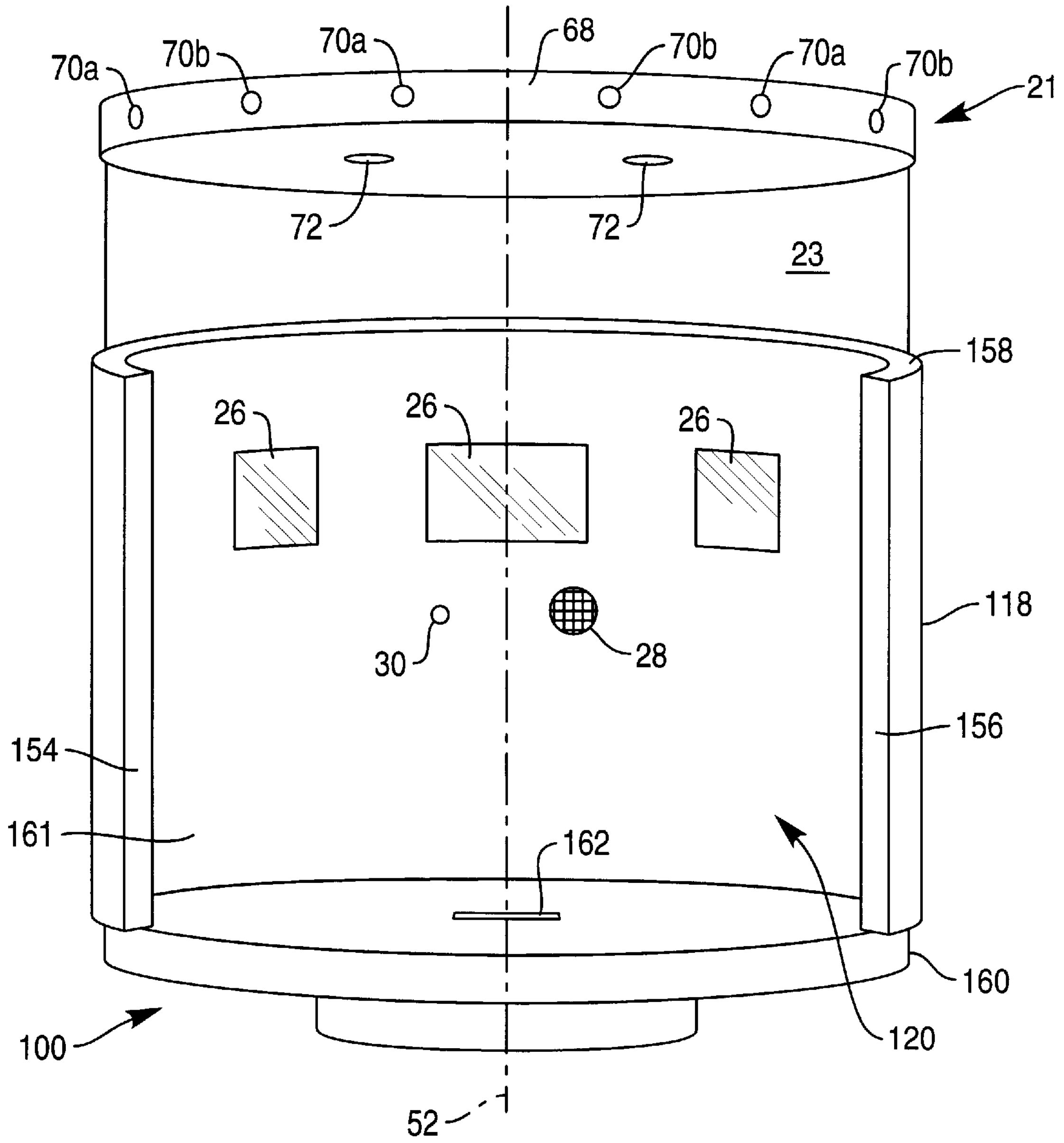
FIG. 3 is a front view of the front portion of an alternative embodiment of the invention.

Referring to FIG. 3, the front part of an alternative embodiment of an SST is shown, wherein like numerals refer to like parts in FIGS. 1 and 2. The front part 100 of the alternative embodiment includes a fascia 118 defining a privacy area (shown generally by arrow 120), a covering 21 in the form of a canopy, a dispensing area 122, and a spacer 23 separating the fascia 118 from the canopy 21.

The fascia 118 incorporates a user interface 24 including a human iris recognition sensor 26, a microphone 28, and a loudspeaker 30.

The fascia 118 is made of high density foamed polymer material for absorbing sound, and the fascia 118 defines an upright longitudinal axis 52 which is substantially vertical. The fascia 118 has a cylindrical shape cut-away to reveal two extremities 154,156, being edges of the fascia 118, in addition to a top surface 158 and a bottom surface 160. Fascia 118 has an inner surface 161 which defines the privacy area 120. The surface 161 is bounded by edges 154,156, top surface 158 and bottom surface 160.

The dispensing area 122 includes a dispensing slot 162 for dispensing valuable media such as bank notes.

In either embodiment, the user interface 24 may also include all the well-known facilities of an SST, such as a display device, manual input means (either separate keys or a touch-screen facility on the display device), a delivery slot for printed material such as a bank statement or a ticket or voucher, a cash deposit slot etc. These features are omitted from the Figures to retain clarity.

Various modifications may be made to the above described embodiments within the scope of the invention, for example, the fascia may be constructed from materials other than high density foamed polymer material. In other embodiments, the SST may be an information terminal.

What is claimed is:

1. A self-service terminal for a user to carry out a self-service transaction, the self-service terminal comprising:

a voice recognition unit for recognizing voice or speech of a user;

a valuable media dispensing unit located below the voice recognition unit and for dispensing valuable media to a user; and a fascia including (i) a substantially arcuate top edge surface, (ii) a substantially arcuate bottom edge surface which is relatively smaller than the arcuate top edge surface, and (iii) a tapered concave inner surface which interconnects the top and bottom edge surfaces to define a privacy area in the vicinity of the voice recognition unit and a dispensing area below the privacy area and in the vicinity of the valuable media dispensing unit.

2. A self-service terminal according to claim 1, wherein the fascia includes a sound absorbing surface for minimizing reflection of noise therefrom.

3. A self-service terminal according to claim 2, wherein the fascia is constructed from sound absorbing material such that the sound absorbing surface is an integral part of the fascia.

4. A self-service terminal according to claim 1, wherein the fascia includes a covering for protecting a user from precipitation or falling objects.

5. A self-service terminal according to claim 4, wherein the covering includes a number of visual indicators for indicating current status of the terminal.

6. A self-service terminal for a user to carry out a self-service transaction, the self-service terminal comprising:

a voice recognition unit for recognizing voice or speech of a user;

a valuable media dispensing unit located below the voice recognition unit and for dispensing valuable media to a user; and a fascia having a substantially vertical upright longitudinal axis and a generally arcuate cross section in a plane transverse to the longitudinal axis, the fascia including (i) a first concave inner surface which defines a privacy area in the vicinity of the voice recognition unit, and (ii) a second concave inner surface which defines a dispensing area located below the privacy area and in the vicinity of the valuable media dispensing unit, the first concave inner surface being tapered relative to the longitudinal axis such that the top of the privacy area is radially more distant from the longitudinal axis than the bottom of the privacy area.

7. A self-service terminal according to claim 6, wherein the fascia includes a sound absorbing surface for minimizing reflection of noise therefrom.

8. A self-service terminal according to claim 7, wherein the fascia is constructed from sound absorbing material such that the sound absorbing surface is an integral part of the fascia.

9. A self-service terminal according to claim 6, wherein the fascia includes a covering for protecting a user from precipitation or falling objects.

10. A self-service terminal according to claim 9, wherein the covering includes a number of visual indicators for indicating current status of the terminal.

11. An automated teller machine (ATM) for an ATM customer to carry out a self-service financial transaction, the ATM comprising:

a voice recognition unit for recognizing voice or speech of an ATM customer;

a bank note dispensing unit located below the voice recognition unit and for dispensing bank notes to an ATM customer; and a fascia including (i) a substantially arcuate top edge surface, (ii) a substantially arcuate bottom edge surface which is relatively smaller than the arcuate top edge surface, and (iii) a tapered inner surface which interconnects the top and bottom edge surfaces to define a privacy area in the vicinity of the voice recognition unit and a dispensing area below the privacy area and in the vicinity of the bank note dispensing unit.

12. An ATM according to claim 11, wherein the fascia includes a sound absorbing surface for minimizing reflection of noise therefrom.

13. An ATM according to claim 12, wherein the fascia is constructed from sound absorbing material such that the sound absorbing surface is an integral part of the fascia.

14. An ATM according to claim 11, wherein the fascia includes a covering for protecting a user from precipitation or falling objects.

15. An ATM according to claim 14, wherein the covering includes a number of visual indicators for indicating current status of the terminal.

16. An automated teller machine (ATM) for an ATM customer to carry out a self-service financial transaction, the ATM comprising:

a voice recognition unit for recognizing voice or speech of an ATM customer;

a bank note dispensing unit located below the voice recognition unit and for dispensing bank notes to an ATM customer; and a fascia having a substantially vertical upright longitudinal axis and including a concave inner surface which defines a privacy area in the vicinity of the voice recognition unit, the concave inner surface having an arcuate upper edge which is at the top of the privacy area and an arcuate lower edge which is at the bottom of the privacy area and in the vicinity of the bank note dispensing unit, the arcuate upper edge being more radially distant from the longitudinal axis at the top of the privacy area than at the bottom of the privacy area.

17. An ATM according to claim 16, wherein the fascia includes a sound absorbing surface for minimizing reflection of noise therefrom.

18. An ATM according to claim 17, wherein the fascia is constructed from sound absorbing material such that the sound absorbing surface is an integral part of the fascia.

19. An ATM according to claim 16, wherein the fascia includes a covering for protecting a user from precipitation or falling objects.

20. An ATM according to claim 19, wherein the covering includes a number of visual indicators for indicating current status of the machine.

* * * * *